(12) United States Patent
Brotzman, Jr.

(10) Patent No.: US 7,303,819 B2
(45) Date of Patent: Dec. 4, 2007

(54) SURFACE TREATMENT OF NANOPARTICLES TO CONTROL INTERFACIAL PROPERTIES AND METHOD OF MANUFACTURE

(75) Inventor: Richard W. Brotzman, Jr., Naperville, IL (US)

(73) Assignee: Nanophase Technologies Corporation, Romeoville, IL (US)

( * ) Notice: Subject to any disclaimer, the term of this patent is extended or adjusted under 35 U.S.C. 154(b) by 61 days.

(21) Appl. No.: 11/076,128

(22) Filed: Mar. 9, 2005

(65) Prior Publication Data

US 2005/0222325 A1    Oct. 6, 2005

Related U.S. Application Data

(60) Provisional application No. 60/559,851, filed on Apr. 6, 2004.

(51) Int. Cl.
*B32B 5/16* (2006.01)
(52) U.S. Cl. ........................ 428/407; 977/830
(58) Field of Classification Search ............... 428/403, 428/407; 977/830
See application file for complete search history.

(56) References Cited

U.S. PATENT DOCUMENTS

| | | | | |
|---|---|---|---|---|
| 5,868,959 | A * | 2/1999 | Mayo et al. | 252/62.54 |
| 5,993,967 | A * | 11/1999 | Brotzman et al. | 428/407 |
| 6,033,781 | A * | 3/2000 | Brotzman et al. | 428/405 |
| 6,599,631 | B2 * | 7/2003 | Kambe et al. | 428/447 |
| 7,182,938 | B2 * | 2/2007 | Andre et al. | 424/59 |
| 2005/0255057 | A1 * | 11/2005 | Andre et al. | 424/59 |

* cited by examiner

*Primary Examiner*—H. T Le
(74) *Attorney, Agent, or Firm*—Wildman, Harrold, Allen & Dixon LLP

(57) ABSTRACT

A surface treated particle comprising a plurality of inorganic, metallic, semi-metallic, and/or metallic oxide particles and a star-graft copolymer with looped and/or linear polymeric structure on a star-graft copolymer, obtainable by a heterogeneous polymerization reaction in the particle surface proximity, encapsulating at least a portion of said particles and a method for making the same. The surface treatment comprises: Si (w, x, y, z), where: w, x, y, and z are mole percent tetrafunctional, trifunctional, difunctional, and monofunctional monomeric units, respectively. Product(s) per se, defined as surface treated ZnO and/or TiO2, and the use of the product(s) per se in personal care formulations are excluded.

13 Claims, No Drawings

SURFACE TREATMENT OF NANOPARTICLES TO CONTROL INTERFACIAL PROPERTIES AND METHOD OF MANUFACTURE

CROSS-REFERENCE TO RELATED PATENTS

This application claims priority from U.S. Provisional Application No. 60/559,851 filed Apr. 6, 2004.

Particulate surfaces, and in particular nanoparticle surfaces, may be surface treated by star-graft copolymers to form uniform coatings according to the methods disclosed in U.S. Pat. Nos. 5,993,967 and 6,033,781, which are incorporated herein by reference.

FIELD OF THE INVENTION

The present invention relates generally to the formation of surface treated particles, and in particular surface treated nanoparticles, with looped and/or linear polymeric structure on a star-graft polymer coating on a particle surface to control the interfacial properties of the particle with controlled polymeric physical properties (such as glass transition temperature and flexibility) and controlled polymeric chemical properties (such as hydrophobic/hydrophobic surface characteristics). The particles may be inorganic, semi-metallic, and/or metallic oxides, and most particularly the formation of these surface treatments on substantially spherical nanoparticles, to control particle interfacial properties. The particles may include such materials as fillers, pigments, lakes, catalysts, matting agents, optical diffusive agents, strengtheners, magnetic particles, reflective materials, film or sheet surfaces, fibers, filaments, and many other forms of materials and particulate additives and especially nanoparticulates.

Compositions made according to the present invention produce uniform, stable composite systems and delivery systems which are not interrupted by oils, water, or other additives which may be in the final formulation. The particle modified by this process may, or may not, be hydrophobic and the degree and composition of surface treatment will depend on application requirements.

Specifically excluded from the present invention are (a) the product(s) per se, defined as surface treated ZnO (zinc oxide) and/or TiO$_2$ (titania), and (b) the use of the product(s) per se in personal care formulations. Personal care formulations are defined as cosmetic or dermatological preparations for skin care, hair care, foot care, sun care, oral care, baby care, toiletries, color cosmetics, personal cleaning, and topical human sunscreens.

BACKGROUND OF THE INVENTION

Particles are added to many different types of compositions and products where the particles are intended to remain in particulate form after the manufacturing or finishing of the product. Product uses of particulates cover such diverse technical utilities as pigments, catalysts, colorants, fillers, matting agents, anti-slip agents, optical diffusing agents, strengthening agents, abrasion resistant agents, viscosity modifiers, reflective particles, carriers for other compounds and materials, abrasive agents, and other types of additives.

There are a number of problems that have long been associated with the use of particles in product formulations—reactivity, compatibility, dispersability, etc. The particle may be reactive and exhibit a wide range of reactivity with alkaline as well as acidic materials. In some applications particle reactivity is highly desirable (ZnO as an adhesion promoter into polymer films in paint applications) but in other applications it is most desirable to have a non-reactive particulate to prevent adverse reactions with formulation ingredients which may detract from a desired activity of a formulation component. In addition, the particle must be compatible with the formulation, to prevent particulate aggregation, and form stable dispersions, suspensions, or emulsions.

These problems are only exacerbated as particles approach nanometer dimensions by the inherently large particle surface area. The large surface area of nanoparticles must be surface treated to enable the economic advantages they impart to be realized.

Particles are also added to polymers to form bulk or thin film composite materials. The particle-matrix interface of the composite materials, as particles approach nanometer dimensions, become substantial and can strongly affect the amount of free volume in the composite material. Thus free-volume dependent properties of the composite material; such as mechanical properties, glass transition temperature, flexure strength, interaction with liquid and gas sorbants, the transport of sorbant material, dielectric and magnetic properties, etc.; may be dependant on the particle-matrix interfacial properties and controlled by the judicious selection of an appropriate surface treatment for the particulate discontinuous phase of the composite, especially as the particle approaches nanometer dimensions.

The surface treatment of particles has been addressed over the years by many different techniques and chemical efforts. Some of the techniques are the application of coatings to the surface of particles, using coupling agents on the surface of the particles, physically modifying the surface of the particles, chemically modifying the innate composition on the surface of the particles, and/or modifying the formulation to accommodate the particle—this latter is one of the least desirable methods of controlling particulate behavior in formulation as it limits formulation composition and ingredients and may alter essential formulation and product properties.

Particulate surfaces have been conventionally coated by adsorption, ion exchange, and covalent bonding. Adsorption and ion exchange require the surface to have the appropriate chemical characteristics. Reactions that enable covalent bonding to a particle surfaces generally involve reactions with a surface-bound hydroxyl group. These coatings are thin surface treatments which may afford formulation and product compatibility and for the best available technology no particulate aggregation, but can not prevent ion migration from reactive particles or affect ultimate control of interfacial material properties.

DESCRIPTION OF THE INVENTION

The shortcomings of the existing art are overcome and additional advantages are provided through the provision of a surface treated nanoparticle having a coating comprised of a star-graft copolymer to which are polymerized looped and/or linear polymer chains. Particulate surfaces, and in particular nanoparticulate surfaces, may be surface treated by star-graft copolymers to form uniform coatings according to the methods disclosed in U.S. Pat. Nos. 5,993,967 and 6,033,781 which are incorporated herein by reference. These uniform particulate surface treatments enable compatibility without particulate aggregation but they are subject to the limitations enumerated above. These star-graft copolymers may be formulated to have pendant groups that are reactive.

It is to these reactive pendant groups that difunctional monomers are graft copolymerized to form looped and/or linear chains.

The surface treatment is applied to particles that may be inorganic, metallic, semi-metallic, and/or metallic oxides. The preferred particles are nanoparticle metal oxides that may be selected from, but are not limited by, the group comprising: $Al_2O_3$, $CeO_2$, ZnO, $TiO_2$, $SiO_2$, and the various crystalline forms of iron oxide ($\gamma$-$Fe_2O_3$, $\alpha$-$Fe_2O_3$, and $Fe_3O_4$).

The star-graft copolymer coatings are formed by reacting specific monomers to form a siloxane-based polymer. The surface treatment encapsulates the nanoparticle. In general, a plurality of nanoparticles is surface treated with the star-graft copolymer and the surface treatment encapsulates at least a portion of the particles discretely, preferably all of the particles discretely. The star-graft copolymer, disclosed in U.S. Pat. Nos. 5,993,967 and 6,033,781, comprises:

$$Si(w, x, y, z)$$

where w, x, y, and z are the mole percent tetrafunctional, trifuictional, difunctional, and monofunctional monomeric units, respectively and wherein w, x, y, and z ranges of about 45-75, 5-25, 5-45, and 5-10, respectively.

As disclosed in U.S. Pat. Nos. 5,993,967 and 6,033,781, a star-graft copolymer, capable of coating and encapsulating nanoparticles, required a relatively large percentage of tetrafunctional monomers to yield a high degree of branching. In addition, the trifunctional monomers directed coating conformation, difunctional monomers were the linear polymer segments, and monofunctional monomers controlled the overall size.

Because difunctional monomers are polymerized to this star-graft polymer to form looped and/or linear polymer chains that extend from the particle surface into the solvating fluid or matrix structure, one skilled in the art would expect that a decrease the monofunctional monomer to enable the star-graft polymer surface treatment to retain functionality, and increase the difunctional monomers to form additional linear polymer segments would be yield the desired surface treatment. However to our surprise, not only was it necessary to decrease the monofunctional monomers to retain functionality on the star-graft polymer and to increase the difunctional monomers to form additional linear chains, but the present invention further requires the star-graft copolymer to have a significantly lower degree of branching, with respect to surface treatments taught in U.S. Pat. Nos. 5,993,967 and 6,033,781—this is an unexpected and surprising result.

It is these looped and/or linear polymer chains that enable surface treatments, what would otherwise be thin coatings, to extend into the application medium and control the interfacial properties of the particle with the tailored physical (such as glass transition temperature and flexibility) and chemical (such as hydrophobic/hydrophobic surface characteristics, high electron density) properties of the looped and/or linear polymer segments of the surface treatment. The chemical nature of the difunctional, loop and/or linear polymer chain-forming monomers, is selected to enable the targeted application.

The present invention relates to a surface treated particle comprising a plurality of inorganic, metallic, semi-metallic, and/or metallic oxide particles and a star-graft copolymer with looped and/or linear polymeric structure on a star-graft copolymer encapsulating at least a portion of said particles, said surface treatment comprising:

$$Si(w, x, y, z)$$

where w, x, y, and z are the mole percent tetrafunctional, trifunctional, difunctional, and monofunctional monomeric units, respectively.

In the preferred surface treated particle:
- w is tetraethylorthosilicate;
- x is selected from the group consisting of $\gamma$-glycidoxypropyltrimethoxysilane, $\gamma$-methacryloxypropyltrimethoxysilane, methyltrimethoxysilane, n-propyltrimethoxysilane, isobutyltrimethoxysilane, n-hexyltrimethoxysilane, n-octyltrimethoxysilane, n-octadecyltrimethoxysilane, phenyltrimethoxysilane, 3-(trimethoxysilyl)propylsuccinic anhydride, heptadecafluorotrimethoxysilane, 3-isocyanatopropyltrimethoxysilane, 2-(diphenylphosphino)ethyltrimethoxysilane, 3-aminopropyltrimethoxysilane, 3-mercaptopropyltrimethoxysilane, n-(trimethoxysilylpropyl)EDTA, pentafluorophenylpropyltrimethoxysilane, trifluoropropyltrimethoxysilane, and the triethoxy-containing counterparts of these monomers;
- y is selected from the group consisting of dicyclohexyldimethoxysilane, diethyldiethoxysilane, dimethyldichlorosilane, dimethyldiethoxysilane, dimethyldimethoxysilane, diphenyldiethoxysilane, diphenyldimethoxysilane, di-n-hexyldichlorosilane, n-hexylmethyldichlorosilane, methyldodecyldiethoxysilane, n-octylmethyldimethoxysilane, and the diethoxy-containing counterparts of these monomers;
- z is selected form the group consisting of n-octadecyldimethylmethoxysilane, triethylsilanol, trimethylethoxysilane, trimethylmethoxysilane, and the ethoxy-containing counterparts of these monomers.

As an alternative to processing methods disclosed in U.S. Pat. Nos. 5,993,967 and 6,033,781, the preferred method of preparing the surface treated particulate comprises mixing the particulate comprising substantially spherical nanocrystalline particles with surface treatment precursors. The siloxane star-graft copolymer, that contains loops and/or linear polymer chains, is formed in the "particle surface proximity" by a heterogeneous polymerization reaction. The mixture is carried out at a temperature, in an environment, and for a time that is effective for the star-graft copolymer to coat the nanocrystalline particle and the difunctional precursors to polymerize to form the looped and/or linear chain surface treatment morphology. Volatile by-products may be driven off as the surface treated powder is heated. The nanoparticles and the coating precursor are added in quantities effective to enable a specific application—low degree of coverage and short loops and/or linear chains for UV-stable polymer composites, to complete, or near complete coverage and large loops and/or linear chains for chemical passive treatments and high free-volume composites. The amount of coating precursor used is directly related to the particle surface area or the particle size.

DETAILED DESCRIPTION OF THE INVENTION

In accordance with the principles of the present invention, a surface treatment of particles, and in particular the surface treated nanoparticles, with looped and/or linear polymeric structure on a star-graft polymer coating on a particle surface and method for making the same are provided.

The surface treatment is applied to particles that may be inorganic, metallic, semi-metallic, and/or metallic oxides. The preferred particles are nanoparticle metal oxides that may be selected from, but is not limited by, the group comprising: $Al_2O_3$, $CeO_2$, ZnO, $TiO_2$, $SiO_2$, and the various crystalline forms of iron oxide ($\gamma$-$Fe_2O_3$, $\alpha$-$Fe_2O_3$, and $Fe_3O_4$). The nanoparticle mean particle size range is from about 1-nm to about 900-nm. The preferred nanoparticle mean particle size range is from about 2-nm to about 500-nm. The most preferred nanoparticle mean particle size range is from about 5-nm to about 100-nm.

The values of w, x, y, and z in the above silicon-based polymers have ranged from 0-50, 0-50, 5-99, and 0-5, respectively. Preferably the values of w, x, y, and z in the above silicon-based polymers have ranged from 0-25, 0-50, 5-99, and 0-5, respectively. Most preferably the values of w, x, y, and z in the above silicon-based polymers have ranged from 0-5, 0-50, 5-99, and 0-5, respectively.

Various combinations are employed to control the fractal nature of the siloxane backbone, the degree of looped and/or linear chains, and its chemical nature, that is, the degree of thermodynamic compatibility with a specific diluent or matrix of the surface treatment. Additionally the amount and chemical nature of the difunctional monomers are selected to transform what would otherwise be thin coatings, into loops and/or linear chains that extend into the application medium and control the interfacial properties of the particle with tailored physical and chemical properties of the looped and/or linear polymer segments of the surface treatment.

EXAMPLE 1

General Batch Process for Surface Treating Particles

The method comprises introducing particles comprising a plurality of nanoparticles into a surface treatment vessel that is capable of mixing and heating its contents under a controlled environment. Example of suitable surface treatment vessels comprise a Buchi Rotovap (small scale available from Brinkmann Instruments), V-blender (commercial scale available from Patterson-Kelley), ribbon-blender (commercial scale available from Jaygo), rotary oven (commercial scale available from Thermal Processing Solutions), and a fluidized bed (commercial scale available from Littleford Day).

a) The particles are introduced into the surface treatment vessel using methods known to those skilled in the art. Oxygen is removed from the vessel, typically by vacuum followed by inert gas flush, and the plurality of nanoparticles is mixed by methods such as, but not limited to, rotating the vessel or by rotating elements within the vessel. The particles are substantially spherical nanocrystalline nanoparticles and readily flow using standard unit operation methodologies. Particle mixing is carried out at a temperature, in an environment, and for a time that is effective at exposing particulate surface area to the environment of the surface treatment vessel enabling conditioning of the particle surface. Mixing may occur continuously, or at programmed intervals, and at a range of mixing rates. Mixing may occur at room temperature or at temperatures above or below room temperature depending on the application requirements of the surface treated particles. The degree of mixing may be used to control the bulk density of the final product—greater mixing yields a higher bulk density particulate product.

b) Particle surface conditioning comprises, but is not limited to, removing material sorbed to the particle surface, adding dopants to the particle surface, functionalizing the particle surface, or a combination of conditioning steps. Particle surface conditioning may be accomplished by, but is not limited to, the following unit operations: vacuum treatment, plasma treatment, washing or flushing or fluidizing with a gas, fluid washing, reactive gas or fluid treatment, etc. In all instances reactive by-products and residues are removed prior to the application of surface treatment precursors.

c) Subsequent to particle surface conditioning, the particles are mixed with surface treatment precursors and heated in an environment, to a pre-determined temperature, and for a time effective for the star-graft copolymer to coat the nanocrystalline particle and the difunctional precursors to polymerize to form the looped and/or linear chains on the star-graft copolymer. Examples of generic coating precursors include, but are not limited to, alkoxysilanes, chlorosilanes, silanols, metal alkoxides, and metal benzylates. During surface treatment particulate mixing enables continuous surface exposure and promotes application of a uniform surface treatment to the plurality of particles. The nanoparticles and the coating precursor are added in relative quantities effective to enable a specific application. The amount of coating precursor used is directly related to the particle surface area or the particle size.

d) Surface treatment sequences may include, but are not limited by, the followings process sequences: particle conditioning followed by surface treatment as in b) and c) above, multiple particle conditioning steps followed by surface treatment, particle conditioning followed by multiple surface treatment steps, sequential particle conditioning—surface treatment—particle conditioning—surface treatment steps, and others imagined by those skilled in the art.

e) The particles may comprise a single composition or multiple compositions.

f) Methods of introducing the surface treatment precursors may include, but are not limited by, fluid spray or vapor flow, employing any metered technique known to those skilled in the art.

g) The surface treatment precursors may be introduced as a precursor mixture, as a precursor mixture followed by a single precursor, or by sequential single precursor additions.

h) The surface treated particles are dried, if wet, cooled to room temperature, if reaction occurs at elevated temperature, and removed from the surface treatment vessel.

EXAMPLE 2

Batch Process for Surface Treating $Al_2O_3$

The following process description is for preparing surface treated $Al_2O_3$ particles. The surface treated $Al_2O_3$ is a polymer additive to a dielectric polymeric coating to impart abrasion-resistance, increase coating toughness, and increase the coating yield strength.

The product is prepared by the batch process detailed in Example 1.

a) 8-kg of $Al_2O_3$ nanoparticles, with a surface area of 35-$m^2$/g, is weighed into a plastic bag and manually charged into a clean, 2-$ft^3$ V-blender. Oxygen is removed by evacuating the V-blender to full vacuum level followed by vacuum relief of the V-blender with nitrogen. The evacuation and relieve cycle is repeated twice.

b) With the V-blender filled with inert gas, the V-blender is rotated at 5 RPM, and the V-blender is constantly flushed with nitrogen and heated to 60° C. to condition the particles by removing sorbed materials.

c) Diphenyldimethoxysilane (1012.1 g) and phenyltrimethoxysilane (205.3 g) monomers are homogeneously mixed using a paddle mixer to form a Si(0, 20, 80, 0) surface treatment precursor mixture (1217.4 g total weight).

d) Subsequent to particle surface conditioning, when the particles are 60° C., the surface treatment precursor mixture is introduced into the V-blender through a nozzle by inert pressure displacement and sprayed on the particles as the particles are mixing. The temperature continues to ramp to 110 to 120° C. Particle mixing and vapor-phase transport enable surface treatment precursors to wet the particles and react to coat the nanocrystalline $Al_2O_3$. The temperature is maintained at 110 to 120° C. for 1-hour.

e) The surface treated $Al_2O_3$ is dried by pulling a vacuum, while purging the vessel with inert gas, $N_2$, on the surface treatment vessel. Vacuum removes un-reacted surface treatment precursors and reaction by-products. At the same time the temperature of the vessel is cooled to room temperature. The surface treated $Al_2O_3$ is removed from the vessel at room temperature.

The surface treated $Al_2O_3$ product, when added to a dielectric polymeric coating, imparts abrasion-resistance, increases coating toughness, and increase the coating yield strength. At the same time the electron-rich surface treatment effectively scatters electrons and ions traveling through the polymer during application an electric field and prevents the particles from trapping charge carriers—no other known commercial product or known surface treatment on a nanoparticle enables the observed improvements in mechanical properties of the coating without significantly degrading the dielectric properties of the polymer coating and trapping charge.

The above batch process may be scaled to surface treat larger amounts of particles or rendered continuous, as will be recognized by persons skilled in the art, by employing continuous mixing and heating equipment and appropriate process modifications.

EXAMPLE 3

Specific Surface Treatment Examples

1) Mechanical property improvement with dielectric strength—Si(0, 20, 80, 0)/phenyltrimethoxysilane, diphenyldimethoxysilane; approximately 15.2 wt % surface treatment precursor mixture applied to $Al_2O_3$ (35 $m^2$/g).

2) Mechanical property improvement with epoxy functionality (polar polymer matrix)—Si(0-5, 10-50, 5-99, 0-5)/tetraethylorthosilicate, 65-glycidoxypropyltrimethoxysilane, diphenyldimethoxysilane, trimethylmethoxysilane; approximately 15 wt % surface treatment precursor mixture applied to $Al_2O_3$ (35 $m^2$/g).

3) Mechanical property improvement with acrylate functionality (polar polymer matrix)—Si(0-5, 10-50, 5-99, 0-5)/ tetraethylorthosilicate, γ-methacryloxypropyltrimethoxysilane, diphenyldimethoxysilane, trimethylmethoxysilane; approximately 15 wt % surface treatment precursor mixture applied to $Al_2O_3$ (35 $m^2$/g).

4) Mechanical property improvement with epoxy functionality (non-polar polymer matrix)—Si(0-5, 10-50, 5-99, 0-5)/tetraethylorthosilicate, γ-glycidoxypropyltrimethoxysilane, dimethydimethoxysilane or propylmethyldimethoxysilane or octylmethyldimethoxysilane, trimethylmethoxysilane; approximately 15 wt % surface treatment precursor mixture applied to $Al_2O_3$ (35 $m^2$/g).

5) UV resistance (polar polymer matrix)—Si(0, 20, 80, 0)/phenyltrimethoxysilane, diphenyldimethoxysilane; 3.6 wt % surface treatment precursor mixture applied to ZnO (23 $m^2$/g).

6) UV resistance (polar polymer matrix)—Si(0, 20, 80, 0)/phenyltrimethoxysilane, diphenyldimethoxysilane; approximately 5.5 wt % surface treatment precursor mixture applied to ZnO (35 $m^2$/g).

7) UV resistance (non-polar polymer matrix)—Si(0, 20, 80, 0)/methyltrimethoxysilane, dimethyldimethoxysilane or octylmethyldimethoxysilane; approximately 2.5 wt % surface treatment precursor mixture applied to ZnO (23 $m^2$/g).

8) Chemically passive surface treatment (polar polymer matrix)—Si(0, 10-40, 90-60, 0)/octyltrimethoxysilane, diphenyldimethoxysilane; approximately 4 wt % surface treatment precursor mixture applied to ZnO (23 $m^2$/g).

9) UV resistance (polar polymer matrix)—Condition surface with Al-dopants using aluminum tri-sec-butoxide/isopropanol solution; surface treat with Si(0-5, 10-50, 5-99, 0-5)/tetraethylorthosilicate, octyltrimethoxysilane, diphenyldimethoxysilane, trimethylmethoxysilane; approximately 8 wt % surface treatment precursor mixture applied to $TiO_2$ (50 $m^2$/g).

10) Scratch and abrasion resistance in transparent coatings—Si(0, 10-40, 90-60, 0)/propyltrimethoxysilane, dimethyldimethoxysilane; approximately 10 wt % surface treatment precursor mixture applied to $Al_2O_3$ (35 $m^2$/g).

The above examples may have ethoxy-based monomers substituted for some, or all, of the surface treatment precursors. Additionally, the examples illustrate surface treatment applied to one particle type, however, multiple particle types may be surfaced treated at the same time.

While particular elements, embodiment, and applications of the present invention have been shown and described, it will be understood, of course, that the invention is not limited thereto since modifications may be made by those skilled in the art, particularly in light of the forgoing teachings. It is therefore contemplated by the appended claims to cover such modifications as incorporate those features which come within the spirit and scope of the invention.

What is claimed is:

1. A surface treated particle comprising:
    a particle including a size between about 1.0 nm to about 900.0 nm;
    a star-graft copolymer coating the particle, the star-graft copolymer comprising Si(w, x, y, z) and reactive pendant groups; and
    a plurality of difunctional monomers graft copolymerized to the pendant groups to form looped and/or linear polymeric chains; wherein
    w, x, y, and z are tetrafunctional, trifunctional, difunctional, and monofunctional monomers, respectively and are present in an amount of about 0-15.0 mole percent, about 0-50.0 mole percent, about 5.0-99.0 mole percent, and about 0-5.0 mole percent respectively;

with the exclusion of products per se, defined as surface treated ZnO and/or $TiO_2$, and the use of the products in personal care formulations.

2. The surface treated particle of claim 1, wherein the polymeric chains are looped chains.

3. The surface treated particle of claim 1, wherein the polymeric chains are linear chains.

4. The surface treated particle of claim 1, wherein the polymeric chains are a combination of looped chains and linear chains.

5. The surface treated particle of claim 1, wherein the particle is selected from the group consisting of inorganic particles, metallic particles, semi-metallic particles, and metallic oxide particles and combinations thereof.

6. The surface treated particle of claim 1, wherein the particle is selected from the group consisting of $Al_2O_3$, $CeO_2$, $SiO_2$, $\gamma\text{-}Fe_2O_3$, $\alpha\text{-}Fe_2O_3$, and $Fe_3O_4$.

7. The surface treated particle of claim 1, wherein the particle is a substantially spherical nanocrystalline particle.

8. The surface treated particle of claim 1, wherein the particle is a nanoparticle including a particle size ranging from approximately 2-500 nm.

9. The surface treated particle of claim 1, wherein the particle is a nanoparticle including a particle size ranging from approximately 5-100 nm.

10. The surface treated particle of claim 1, wherein the tetrafunctional monomers are tetraethylorthosilicate.

11. The surface treated particle of claim 1, wherein the trifunctional monomers are selected from the group consisting of γ-glycidoxypropyltrimethoxysilane, γ-methacryloxypropyltrimethoxysilane, methyltrimethoxysilane, n-propyltrimethoxysilane, isobutyltrimethoxysilane, n-hexyltrimethoxysilane, n-octyltrimethoxysilane, n-octadecyltrimethoxysilane, phenyltrimethoxysilane, 3-(trimethoxysilyl) propylsuccinicanhydride, heptadecafluorotrimethoxysilane, 3-isocyanatopropyltrimethoxysilane, 2-(diphenylphosphino) ethyltrimethoxysilane, 3-aminopropyltrimethoxysilane, 3-mercaptopropyltrimethoxysilane, n-(trimethoxysilpropyl) EDTA, pentafluorophenyipropyltrimethoxysilane, trifluoropropyltrimethoxysilane, and the triethoxy-containing counterparts of these monomers.

12. The surface treated particle of claim 1, wherein the difunctional monomers are selected from the group consisting of dicyclohexyldimethoxysilane, diethyldiethoxysilane, dimethyldichlorosilane, dimethyldiethoxysilane, dimethyldimethoxysilane, diphenyldiethoxysilane, diphenyldimethoxysilane, di-n-hexyldichlorosilane, n-hexylmethyldichlorosilane, methyldodecyldiethoxysilane, n-octylmethyldimethoxysilane, and the diethoxy-containing counterparts of these monomers.

13. The surface treated particle of claim 1, wherein the monofunctional monomers are selected from the group consisting of n-octadecyldimethylmethoxysilane, triethylsilanol, trimethylethoxysilane, trimethylmethoxysilane, and the ethoxy-containing counterparts of these monomers.

\* \* \* \* \*